US012532387B2

(12) United States Patent
Mironov et al.

(10) Patent No.: US 12,532,387 B2
(45) **Date of Patent: *Jan. 20, 2026**

(54) AEROSOL-GENERATING ARTICLE WITH INTERNAL SUSCEPTOR

(71) Applicant: Philip Morris Products S.A., Neuchatel (CH)

(72) Inventors: Oleg Mironov, Neuchatel (CH); Ihar Nikolaevich Zinovik, Peseux (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,423

(22) Filed: Aug. 30, 2023

(65) Prior Publication Data

US 2023/0413394 A1 Dec. 21, 2023

Related U.S. Application Data

(63) Continuation of application No. 15/312,144, filed as application No. PCT/EP2015/058606 on Apr. 21, 2015, now Pat. No. 11,832,369.

(30) Foreign Application Priority Data

May 21, 2014 (EP) .................................... 14169241

(51) Int. Cl.
*H05B 6/10* (2006.01)
*A24C 5/01* (2020.01)
(Continued)

(52) U.S. Cl.
CPC ............... *H05B 6/108* (2013.01); *A24C 5/01* (2020.01); *A24D 1/20* (2020.01); *A24F 40/46* (2020.01); *A24F 40/465* (2020.01); *A24F 40/20* (2020.01)

(58) Field of Classification Search
None
See application file for complete search history.

(56) References Cited

U.S. PATENT DOCUMENTS

| | | | |
|---|---|---|---|
| 3,065,755 | A | 11/1962 | Boyd et al. |
| 4,989,619 | A | 2/1991 | Clearman et al. |

(Continued)

FOREIGN PATENT DOCUMENTS

| | | | |
|---|---|---|---|
| CN | 1126426 | A | 7/1996 |
| CN | 202819630 | U | 3/2013 |

(Continued)

OTHER PUBLICATIONS

Japanese Office Action dated Apr. 10, 2024 in corresponding Japanese Patent Application No. 2021-112623 (with English translation), 5 pages.

(Continued)

*Primary Examiner* — Phu H Nguyen
(74) *Attorney, Agent, or Firm* — Oblon, McClelland, Maier & Neustadt, L.L.P.

(57) ABSTRACT

An aerosol-generating article is provided, including: a plurality of elements assembled in a form of a rod having a mouth end and a distal end upstream from the mouth end, the plurality of elements including an aerosol-forming substrate located at or towards the distal end of the rod, in which an elongate susceptor is arranged substantially longitudinally within the rod and in thermal contact with the aerosol-forming substrate, in which the aerosol-forming substrate includes tobacco, and in which the aerosol-forming substrate further includes a single aerosol former or a combination of two or more aerosol formers. An aerosol-generating system, a method of operating the aerosol-generating article, and a method of producing the aerosol-generating article, are also provided.

15 Claims, 1 Drawing Sheet

(51) Int. Cl.

| | |
|---|---|
| ***A24D 1/20*** | (2020.01) |
| ***A24F 40/20*** | (2020.01) |
| ***A24F 40/46*** | (2020.01) |
| ***A24F 40/465*** | (2020.01) |

(56) References Cited

U.S. PATENT DOCUMENTS

| | | | | |
|---|---|---|---|---|
| 5,613,505 | A * | 3/1997 | Campbell .............. | H05B 6/365 131/194 |
| 5,878,752 | A | 3/1999 | Adams et al. | |
| 6,681,998 | B2 | 1/2004 | Sharpe et al. | |
| 2002/0078956 | A1 | 6/2002 | Sharpe et al. | |
| 2004/0050839 | A1 | 3/2004 | Riess et al. | |
| 2005/0172976 | A1 | 8/2005 | Newman et al. | |
| 2007/0102013 | A1* | 5/2007 | Adams .................. | A24F 40/485 131/273 |
| 2013/0146075 | A1 | 6/2013 | Poget et al. | |
| 2015/0083148 | A1 | 3/2015 | Poget et al. | |
| 2017/0188629 | A1 | 7/2017 | Dickens et al. | |

FOREIGN PATENT DOCUMENTS

| | | | |
|---|---|---|---|
| CN | 103689812 | A | 4/2014 |
| DE | 26 20 299 | A1 | 11/1977 |
| DE | 26 20 299 | B2 | 6/1978 |
| EP | 2 340 730 | A1 | 7/2011 |
| EP | 2 609 821 | A1 | 7/2013 |
| JP | 8-511175 | A | 11/1996 |
| JP | H11-505955 | A | 5/1999 |
| JP | 2004-107699 | A | 4/2004 |
| JP | 2007-526018 | A | 9/2007 |
| JP | 2010-178730 | A | 8/2010 |
| JP | 2010-532672 | A | 10/2010 |
| JP | 2013-505240 | A | 2/2013 |
| JP | 2013-511962 | A | 4/2013 |
| JP | 2013545474 | A | 12/2013 |
| JP | 2014073135 | A | 4/2014 |
| JP | 2021-112623 | A | 8/2021 |
| KR | 90-4280 | A | 4/1990 |
| KR | 10-0385395 | B1 | 8/2003 |
| KR | 10-2010-0127817 | A | 12/2010 |
| KR | 10-2012-0102131 | A | 9/2012 |
| KR | 10-2013-0007621 | A | 1/2013 |
| KR | 10-2013-0024886 | A | 3/2013 |
| KR | 10-2013-0054348 | A | 5/2013 |
| KR | 10-1314934 | B1 | 10/2013 |
| KR | 10-2017-0008730 | A | 1/2017 |
| RU | 2 132 629 | C1 | 7/1999 |
| RU | 2 489 948 | C2 | 8/2013 |
| RU | 2 509 516 | C2 | 3/2014 |
| TW | 201002226 | A1 | 1/2010 |
| TW | 201206357 | A1 | 2/2012 |
| WO | WO 1994/006314 | A1 | 3/1994 |
| WO | WO 95/27411 | A1 | 10/1995 |
| WO | WO 2007/024130 | A1 | 3/2007 |
| WO | WO 2008/066804 | A1 | 6/2008 |
| WO | WO 2008/121610 | A1 | 10/2008 |
| WO | WO 2008/138650 | A1 | 11/2008 |
| WO | WO 2009/118085 | A1 | 10/2009 |
| WO | WO 2011/034723 | A1 | 3/2011 |
| WO | WO 2011/117750 | A2 | 9/2011 |
| WO | WO 2011/160788 | A1 | 12/2011 |
| WO | WO 2 444 112 | A1 | 4/2012 |
| WO | WO 2012/109371 | A2 | 8/2012 |
| WO | WO 2012/164009 | A2 | 12/2012 |
| WO | WO 2013/025921 | A1 | 2/2013 |
| WO | WO 2013/083635 | A1 | 6/2013 |
| WO | WO 2013/098397 | A2 | 7/2013 |
| WO | WO 2013/098405 | A2 | 7/2013 |
| WO | WO 2013/098411 | A1 | 7/2013 |
| WO | WO 2013/102609 | A2 | 7/2013 |
| WO | WO 2013/102614 | A2 | 7/2013 |
| WO | WO 2013/158323 | A1 | 10/2013 |
| WO | WO 2013/178768 | A1 | 12/2013 |
| WO | WO 2014/006078 | A1 | 1/2014 |
| WO | WO 2014/040988 | A2 | 3/2014 |
| WO | WO 2014/048745 | A1 | 4/2014 |
| WO | WO 2015/082652 | A1 | 6/2015 |
| WO | WO 2015/082653 | A8 | 6/2015 |
| WO | WO 2015/131058 | A1 | 9/2015 |
| WO | WO 2015/177252 | A1 | 11/2015 |
| WO | WO 2015/177257 | A1 | 11/2015 |
| WO | WO 2015/177264 | A1 | 11/2015 |

OTHER PUBLICATIONS

Japanese Office Action dated May 9, 2024 in corresponding Japanese Patent Application No. 2021-112623 (with English translation), 5 pages.

Japanese Office Action issued Nov. 9, 2023 in Japanese Patent Application No. 2023-136491 (with English translation), 10 pages.

International Search Report and Written Opinion issued Jul. 20, 2015 in PCT/EP2015/058606 filed Apr. 21, 2015.

Office Action issued Sep. 26, 2018 in corresponding Taiwanese Patent Application No. 104114653, 7 pages.

Combined Decision to Grant and Search Report issued Oct. 30, 2018 in Russian Patent Application No. 2016150112/12 (with English translation of the Office Action and English translation of categories of cited documents).

Office Action issued Dec. 24, 2018 in Chinese Patent Application No. 201580022113.4, with English translation, 17 pages.

Office Action issued Apr. 25, 2019 in corresponding Japanese Patent Application No. 2016-568585 (with English Translation), 13 pages2.

Japanese Office Action issued Feb. 18, 2021 in corresponding Japanese Patent Application No. 2020-028060 (with English translation), 3 pages.

Russian Office Action and Search Report issued Dec. 20, 2021 in Russian Patent Application No. 2018146940/03(078430) (with English language translation), 12 pages.

Korean Office Action issued Jan. 25, 2022 in Korean Patent Application No. 10-2016-7030234 (with English translation), 12 pages.

Korean Notice of allowance mailed on Aug. 8, 2023 issued in South Korean Patent Application No. 2022-7037257 filed on Apr. 21, 2015, with English translation, total 5 pages.

Korean Office Action issued Nov. 12, 2024 in Korean Patent Application No. 10-2023-7038410 with English translation, 11 pgs.

Japanese Office Action issued Jul. 7, 2025 in corresponding Japanese Patent Application No. 2025-085376, with English Translation, 3 pages.

Japanese Industrial Standard, "Aluminium and aluminium alloy foils" JIS H 4160 (1994), 14 pages.

* cited by examiner

AEROSOL-GENERATING ARTICLE WITH INTERNAL SUSCEPTOR

CROSS-REFERENCE TO RELATED APPLICATIONS

This application is a continuation of and claims benefit under 35 U.S.C. § 120 to U.S. application Ser. No. 15/312,144, filed Nov. 17, 2016, which is a U.S. National Stage application of PCT/EP2015/058606, filed on Apr. 21, 2015, and claims the benefit of priority under 35 U.S.C. § 119 from EP 14169241.8, filed May 21, 2014, the entire contents of each of which are incorporated herein by reference.

The present specification relates to an aerosol-generating article comprising an aerosol-forming substrate for generating an inhalable aerosol when heated. The aerosol-generating article comprises an elongate susceptor in thermal contact with the aerosol-forming substrate, such that heating of the aerosol-forming substrate may be effected by induction-heating. The specification also relates to a system comprising such an aerosol-generating article and an aerosol-generating device having an inductor for heating the aerosol-generating device.

A number of aerosol-generating articles, or smoking articles, in which tobacco is heated rather than combusted have been proposed in the art. One aim of such heated aerosol-generating articles is to reduce known harmful smoke constituents of the type produced by the combustion and pyrolytic degradation of tobacco in conventional cigarettes.

Typically in such heated aerosol-generating articles, an aerosol is generated by the transfer of heat from a heat source to a physically separate aerosol-forming substrate or material. During smoking, volatile compounds are released from the aerosol-forming substrate by heat transfer from the heat source and entrained in air drawn through the aerosol-generating article. As the released compounds cool, they condense to form an aerosol that is inhaled by the user.

A number of prior art documents disclose aerosol-generating devices for consuming or smoking heated aerosol-generating articles. Such devices include, for example, electrically heated aerosol-generating devices in which an aerosol is generated by the transfer of heat from one or more electrical heating elements of the aerosol-generating device to the aerosol-forming substrate of a heated aerosol-generating article. One advantage of such electrical smoking systems is that they significantly reduce sidestream smoke, while permitting a user to selectively suspend and reinitiate smoking.

An example of an aerosol-generating article, in the form of an electrically heated cigarette, for use in electrically operated aerosol-generating system is disclosed in US 2005/0172976 A1. The aerosol-generating article is constructed to be inserted into a cigarette receiver of an aerosol-generating device of the aerosol-generating system. The aerosol-generating device includes a power source that supplies energy to a heater fixture including a plurality of electrically resistive heating elements, which are arranged to slidingly receive the aerosol-generating article such that the heating elements are positioned alongside the aerosol-generating article.

The system disclosed in US 2005/0172976 A1 utilizes an aerosol-generating device comprising a plurality of external heating elements. Aerosol-generating devices with internal heating elements are also known. In use, the internal heating elements of such aerosol-generating devices are inserted into the aerosol-forming substrate of a heated aerosol-generating article such that the internal heating elements are in direct contact with the aerosol-forming substrate.

Direct contact between an internal heating element of an aerosol-generating device and the aerosol-forming substrate of an aerosol-generating article can provide an efficient means for heating the aerosol-forming substrate to form an inhalable aerosol. In such a configuration, heat from the internal heating element may be conveyed almost instantaneously to at least a portion of the aerosol-forming substrate when the internal heating element is actuated, and this may facilitate the rapid generation of an aerosol. Furthermore, the overall heating energy required to generate an aerosol may be lower than would be the case in an aerosol-generating system comprising an external heater element where the aerosol-forming substrate does not directly contact the external heating element and initial heating of the aerosol-forming substrate occurs primarily by convection or radiation. Where an internal heating element of an aerosol-generating device is in direct contact with an aerosol-forming substrate, initial heating of portions of the aerosol-forming substrate that are in direct contact with the internal heating element will be effected primarily by conduction.

A system involving an aerosol-generating device having an internal heating element is disclosed in WO2013102614. In this system a heating element is brought into contact with an aerosol-forming substrate, the heating element undergoes a thermal cycle during which it is heated and then cooled. During contact between the heating element and the aerosol-forming substrate, particles of the aerosol-forming substrate may adhere to a surface of the heating element. Furthermore, volatile compounds and aerosol evolved by the heat from the heating element may become deposited on a surface of the heating element. Particles and compounds adhered to and deposited on the heating element may prevent the heating element from functioning in an optimal manner. These particles and compounds may also break down during use of the aerosol-generating device and impart unpleasant or bitter flavours to a user. For these reasons it is desirable to clean the heating element periodically. A cleaning process may involve use of a cleaning tool such as a brush. If cleaning is carried out inappropriately, the heating element may become damaged or broken. Furthermore, inappropriate or careless insertion and removal of an aerosol-generating article into the aerosol-generating device may also damage or break the heating element.

An aerosol-generating article is provided comprising a plurality of elements assembled in the form of a rod, the rod having a mouth end and a distal end upstream from the mouth end. The plurality of elements include an aerosol-forming substrate located at, or towards, the distal end of the rod. An elongate susceptor is arranged substantially longitudinally within the rod and is in thermal contact with the aerosol-forming substrate. The susceptor may have a thickness of between 10 and 500 micrometres. In preferred embodiments the susceptor may have a thickness of between 10 and 100 micrometres. The susceptor may be configured for dissipating energy of between 1 Watt and 8 Watt when used in conjunction with a particular inductor, for example between 1.5 Watt and 6 Watt. By configured, it is meant that the elongate susceptor may be made of a specific material and may have specific dimensions that allow energy dissipation of between 1 Watt and 8 Watt when used in conjunction with a particular conductor that generates a fluctuating magnetic field of known frequency and known field strength.

An aerosol-generating system is also provided comprising an electrically-operated aerosol-generating device having an inductor for producing an alternating or fluctuating electromagnetic field, and an aerosol-generating article comprising a susceptor as described and defined herein. The aerosol-generating article engages with the aerosol-generating device such that the fluctuating electromagnetic field produced by the inductor induces a current in the susceptor, causing the susceptor to heat up. The electrically-operated aerosol-generating device is preferably capable of generating a fluctuating electromagnetic field having a magnetic field strength (H-field strength) of between 1 and 5 kilo amperes per metre (kA/m), preferably between 2 and 3 kA/m, for example about 2.5 kA/m. The electrically-operated aerosol-generating device is preferably capable of generating a fluctuating electromagnetic field having a frequency of between 1 and 30 MHz, for example between 1 and 10 MHz, for example between 5 and 7 MHz.

The elongate susceptor is part of a consumable item, and thus is only used once. Thus, any residues that form on the susceptor during heating do not cause a problem for heating of a subsequent aerosol-generating article. The flavour of a sequence of aerosol-generating articles may be more consistent due to the fact that a fresh susceptor acts to heat each article. Furthermore, cleaning of the aerosol-generating device is less critical and may be achieved without damage to a heating element. Furthermore, the lack of a heating element that needs to penetrate an aerosol-forming substrate means that insertion and removal of an aerosol-generating article into an aerosol-generating device is less likely to cause inadvertent damage to either the article or the device. The overall aerosol-generating system is, therefore, more robust.

As used herein, the term 'aerosol-forming substrate' is used to describe a substrate capable of releasing, upon heating, volatile compounds, which can form an aerosol. The aerosol generated from aerosol-forming substrates of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the terms 'upstream' and 'downstream' are used to describe the relative positions of elements, or portions of elements, of the aerosol-generating article in relation to the direction in which a user draws on the aerosol-generating article during use thereof.

The aerosol-generating article is in the form of a rod that comprises two ends: a mouth end, or proximal end, through which aerosol exits the aerosol-generating article and is delivered to a user, and a distal end. In use, a user may draw on the mouth end in order to inhale aerosol generated by the aerosol-generating article. The mouth end is downstream of the distal end. The distal end may also be referred to as the upstream end and is upstream of the mouth end.

Preferably, the aerosol-generating article is a smoking article that generates an aerosol that is directly inhalable into a user's lungs through the user's mouth. More, preferably, the aerosol-generating article is a smoking article that generates a nicotine-containing aerosol that is directly inhalable into a user's lungs through the user's mouth.

As used herein, the term 'aerosol-generating device' is used to describe a device that interacts with an aerosol-forming substrate of an aerosol-generating article to generate an aerosol. Preferably, the aerosol-generating device is a smoking device that interacts with an aerosol-forming substrate of an aerosol-generating article to generate an aerosol that is directly inhalable into a user's lungs thorough the user's mouth. The aerosol-generating device may be a holder for a smoking article.

When used herein in relation to an aerosol-generating article, the term 'longitudinal' is used to describe the direction between the mouth end and the distal end of the aerosol-generating article and the term 'transverse' is used to describe the direction perpendicular to the longitudinal direction.

When used herein in relation to an aerosol-generating article, the term 'diameter' is used to describe the maximum dimension in the transverse direction of the aerosol-generating article. When used herein in relation to an aerosol-generating article, the term 'length' is used to describe the maximum dimension in the longitudinal direction of the aerosol-generating article.

As used herein, the term 'susceptor' refers to a material that can convert electromagnetic energy into heat. When located within a fluctuating electromagnetic field, eddy currents induced in the susceptor cause heating of the susceptor. As the elongate susceptor is located in thermal contact with the aerosol-forming substrate, the aerosol-forming substrate is heated by the susceptor.

The aerosol-generating article is designed to engage with an electrically-operated aerosol-generating device comprising an induction heating source. The induction heating source, or inductor, generates the fluctuating electromagnetic field for heating a susceptor located within the fluctuating electromagnetic field. In use, the aerosol-generating article engages with the aerosol-generating device such that the susceptor is located within the fluctuating electromagnetic field generated by the inductor.

The susceptor has a length dimension that is greater than its width dimension or its thickness dimension, for example greater than twice its width dimension or its thickness dimension. Thus the susceptor may be described as an elongate susceptor. The susceptor is arranged substantially longitudinally within the rod. This means that the length dimension of the elongate susceptor is arranged to be approximately parallel to the longitudinal direction of the rod, for example within plus or minus 10 degrees of parallel to the longitudinal direction of the rod. In preferred embodiments, the elongate susceptor element may be positioned in a radially central position within the rod, and extends along the longitudinal axis of the rod.

The susceptor is preferably in the form of a pin, rod, or blade. The susceptor preferably has a length of between 5 mm and 15 mm, for example between 6 mm and 12 mm, or between 8 mm and 10 mm. The susceptor preferably has a width of between 1 mm and 5 mm and may have a thickness of between 0.01 mm and 2 mm. for example between 0.5 mm and 2 mm. A preferred embodiment may have a thickness of between 10 micrometres and 500 micrometres, or even more preferably between 10 and 100 micrometers. If the susceptor has a constant cross-section, for example a circular cross-section, it has a preferable width or diameter of between 1 mm and 5 mm.

The susceptor may be formed from any material that can be inductively heated to a temperature sufficient to generate an aerosol from the aerosol-forming substrate. Preferred susceptors comprise a metal or carbon. A preferred susceptor may comprise a ferromagnetic material, for example ferritic iron, or a ferromagnetic steel or stainless steel. A suitable susceptor may be, or comprise, aluminium. Preferred susceptors may be formed from 400 series stainless steels, for example grade 410, or grade 420, or grade 430 stainless steel. Different materials will dissipate different amounts of energy when positioned within electromagnetic fields having similar values of frequency and field strength. Thus, parameters of the susceptor such as material type, length, width, and thickness may all be altered to provide a desired power dissipation within a known electromagnetic field.

Preferred susceptors may be heated to a temperature in excess of 250 degrees Centigrade. Suitable susceptors may comprise a non-metallic core with a metal layer disposed on the non-metallic core, for example metallic tracks formed on a surface of a ceramic core.

A susceptor may have a protective external layer, for example a protective ceramic layer or protective glass layer encapsulating the elongate susceptor. The susceptor may comprise a protective coating formed by a glass, a ceramic, or an inert metal, formed over a core of susceptor material.

The susceptor is arranged in thermal contact with the aerosol-forming substrate. Thus, when the susceptor heats up the aerosol-forming substrate is heated up and an aerosol is formed. Preferably the susceptor is arranged in direct physical contact with the aerosol-forming substrate, for example within the aerosol-forming substrate.

The aerosol-generating article may contain a single elongate susceptor. Alternatively, the aerosol-generating article may comprise more than one elongate aerosol-generating article.

Preferably, the aerosol-forming substrate is a solid aerosol-forming substrate. The aerosol-forming substrate may comprise both solid and liquid components.

Preferably, the aerosol-forming substrate comprises nicotine. In some preferred embodiments, the aerosol-forming substrate comprises tobacco. For example, the aerosol-forming material may be a sheet of homogenised tobacco.

Alternatively, or in addition, the aerosol-forming substrate may comprise a non-tobacco containing aerosol-forming material. For example, the aerosol-forming material may be a sheet comprising a nicotine salt and an aerosol former.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco.

As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to the longitudinal axis of the aerosol-generating article.

In a preferred embodiment, the aerosol-forming substrate comprises a gathered textured sheet of homogenised tobacco material.

As used herein, the term 'textured sheet' denotes a sheet that has been crimped, embossed, debossed, perforated or otherwise deformed. The aerosol-forming substrate may comprise a gathered textured sheet of homogenised tobacco material comprising a plurality of spaced-apart indentations, protrusions, perforations or a combination thereof.

In a particularly preferred embodiment, the aerosol-forming substrate comprises a gathered crimped sheet of homogenised tobacco material.

Use of a textured sheet of homogenised tobacco material may advantageously facilitate gathering of the sheet of homogenised tobacco material to form the aerosol-forming substrate.

As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled.

The aerosol-forming substrate may be in the form of a plug comprising an aerosol-forming material circumscribed by a paper or other wrapper. Where an aerosol-forming substrate is in the form of a plug, the entire plug including any wrapper is considered to be the aerosol-forming substrate.

In a preferred embodiment, the aerosol-forming substrate comprises a plug comprising a gathered sheet of homogenised tobacco material, or other aerosol-forming material, circumscribed by a wrapper. Preferably the, or each, elongate susceptor is positioned within the plug in direct contact with the aerosol-forming material.

As used herein, the term 'aerosol former' is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Preferred aerosol formers are polyhydric alcohols or mixtures thereof, such as propylene glycol, triethylene glycol, 1,3-butanediol and, most preferred, glycerine.

The aerosol-forming substrate may comprise a single aerosol former. Alternatively, the aerosol-forming substrate may comprise a combination of two or more aerosol formers.

Preferably, the aerosol-forming substrate has an aerosol former content of greater than 5% on a dry weight basis.

The aerosol aerosol-forming substrate may have an aerosol former content of between approximately 5% and approximately 30% on a dry weight basis.

In a preferred embodiment, the aerosol-forming substrate has an aerosol former content of approximately 20% on a dry weight basis.

Aerosol-forming substrates comprising gathered sheets of homogenised tobacco for use in the aerosol-generating article may be made by methods known in the art, for example the methods disclosed in WO 2012/164009 A2.

Preferably, the aerosol-forming substrate has an external diameter of at least 5 mm. The aerosol-forming substrate may have an external diameter of between approximately 5 mm and approximately 12 mm, for example of between approximately 5 mm and approximately 10 mm or of between approximately 6 mm and approximately 8 mm. In a preferred embodiment, the aerosol-forming substrate has an external diameter of 7.2 mm+/−10%.

The aerosol-forming substrate may have a length of between approximately 5 mm and approximately 15 mm, for example between about 8 mm and about 12 mm. In one embodiment, the aerosol-forming substrate may have a length of approximately 10 mm. In a preferred embodiment, the aerosol-forming substrate has a length of approximately 12 mm. Preferably, the elongate susceptor is approximately the same length as the aerosol-forming substrate.

Preferably, the aerosol-forming substrate is substantially cylindrical.

A support element may be located immediately downstream of the aerosol-forming substrate and may abut the aerosol-forming substrate.

The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the support element is formed from cellulose acetate.

The support element may comprise a hollow tubular element. In a preferred embodiment, the support element comprises a hollow cellulose acetate tube.

The support element preferably has an external diameter that is approximately equal to the external diameter of the aerosol-generating article.

The support element may have an external diameter of between approximately 5 millimetres and approximately 12 millimetres, for example of between approximately 5 millimetres and approximately 10 millimetres or of between approximately 6 millimetres and approximately 8 millimetres. In a preferred embodiment, the support element has an external diameter of 7.2 millimetres+/−1-10%.

The support element may have a length of between approximately 5 millimetres and approximately 15 mm. In a preferred embodiment, the support element has a length of approximately 8 millimetres.

An aerosol-cooling element may be located downstream of the aerosol-forming substrate, for example an aerosol-cooling element may be located immediately downstream of a support element, and may abut the support element.

The aerosol-cooling element may be located between the support element and a mouthpiece located at the extreme downstream end of the aerosol-generating article.

The aerosol-cooling element may have a total surface area of between approximately 300 square millimetres per millimetre length and approximately 1000 square millimetres per millimetre length. In a preferred embodiment, the aerosol-cooling element has a total surface area of approximately 500 square millimetres per millimetre length.

The aerosol-cooling element may be alternatively termed a heat exchanger.

The aerosol-cooling element preferably has a low resistance to draw. That is, the aerosol-cooling element preferably offers a low resistance to the passage of air through the aerosol-generating article. Preferably, the aerosol-cooling element does not substantially affect the resistance to draw of the aerosol-generating article.

The aerosol-cooling element may comprise a plurality of longitudinally extending channels. The plurality of longitudinally extending channels may be defined by a sheet material that has been one or more of crimped, pleated, gathered and folded to form the channels. The plurality of longitudinally extending channels may be defined by a single sheet that has been one or more of crimped, pleated, gathered and folded to form multiple channels. Alternatively, the plurality of longitudinally extending channels may be defined by multiple sheets that have been one or more of crimped, pleated, gathered and folded to form multiple channels.

In some embodiments, the aerosol-cooling element may comprise a gathered sheet of material selected from the group consisting of metallic foil, polymeric material, and substantially non-porous paper or cardboard. In some embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

In a preferred embodiment, the aerosol-cooling element comprises a gathered sheet of biodegradable material. For example, a gathered sheet of non-porous paper or a gathered sheet of biodegradable polymeric material, such as polylactic acid or a grade of Mater-Bi® (a commercially available family of starch based copolyesters).

In a particularly preferred embodiment, the aerosol-cooling element comprises a gathered sheet of polylactic acid.

The aerosol-cooling element may be formed from a gathered sheet of material having a specific surface area of between approximately 10 square millimetres per milligram and approximately 100 square millimetres per milligram weight. In some embodiments, the aerosol-cooling element may be formed from a gathered sheet of material having a specific surface area of approximately 35 $mm^2$/mg.

The aerosol-generating article may comprise a mouthpiece located at the mouth end of the aerosol-generating article. The mouthpiece may be located immediately downstream of an aerosol-cooling element and may abut the aerosol-cooling element. The mouthpiece may comprise a filter. The filter may be formed from one or more suitable filtration materials. Many such filtration materials are known in the art. In one embodiment, the mouthpiece may comprise a filter formed from cellulose acetate tow.

The mouthpiece preferably has an external diameter that is approximately equal to the external diameter of the aerosol-generating article.

The mouthpiece may have an external diameter of a diameter of between approximately 5 millimetres and approximately 10 millimetres, for example of between approximately 6 millimetres and approximately 8 millimetres. In a preferred embodiment, the mouthpiece has an external diameter of 7.2 millimetres+/−10%.

The mouthpiece may have a length of between approximately 5 millimetres and approximately 20 millimetres. In a preferred embodiment, the mouthpiece has a length of approximately 14 millimetres.

The mouthpiece may have a length of between approximately 5 millimetres and approximately 14 millimetres. In a preferred embodiment, the mouthpiece has a length of approximately 7 millimetres.

The elements of the aerosol-forming article, for example the aerosol-forming substrate and any other elements of the aerosol-generating article such as a support element, an aerosol-cooling element, and a mouthpiece, are circumscribed by an outer wrapper. The outer wrapper may be formed from any suitable material or combination of materials. Preferably, the outer wrapper is a cigarette paper.

The aerosol-generating article may have an external diameter of between approximately 5 millimetres and approximately 12 millimetres, for example of between approximately 6 millimetres and approximately 8 millimetres. In a preferred embodiment, the aerosol-generating article has an external diameter of 7.2 millimetres+/−10%.

The aerosol-generating article may have a total length of between approximately 30 millimetres and approximately 100 millimetres. In preferred embodiments, the aerosol-generating article has a total length of between 40 mm and 50 mm, for example approximately 45 millimetres.

The aerosol-generating device of the aerosol-generating system may comprise: a housing; a cavity for receiving the aerosol-generating article, an inductor arranged to generate a fluctuating electromagnetic field within the cavity; an electrical power supply connected to the inductor; and a control element configured to control the supply of power from the power supply to the inductor.

The inductor may comprise one or more coils that generate a fluctuating electromagnetic field. The coil or coils may surround the cavity.

Preferably the device is capable of generating a fluctuating electromagnetic field of between 1 and 30 MHz, for example, between 2 and 10 MHz, for example between 5 and 7 MHz.

Preferably the device is capable of generating a fluctuating electromagnetic field having a field strength (H-field) of between 1 and 5 kA/m, for example between 2 and 3 kA/m, for example about 2.5 kA/m.

Preferably, the aerosol-generating device is a portable or handheld aerosol-generating device that is comfortable for a user to hold between the fingers of a single hand.

The aerosol-generating device may be substantially cylindrical in shape

The aerosol-generating device may have a length of between approximately 70 millimetres and approximately 120 millimetres.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The control element may be a simple switch. Alternatively the control element may be electric circuitry and may comprise one or more microprocessors or microcontrollers.

The aerosol-generating system may comprise an aerosol-generating device and one or more aerosol-generating articles configured to be received in the cavity of the aerosol-generating device such that a susceptor located within the aerosol-generating article is positioned within a fluctuating electromagnetic field generated by the inductor.

A method of using an aerosol-generating article as described above may comprise the steps of positioning the article relative to an electrically-operated aerosol-generating device such that the elongate susceptor of the article is within a fluctuating electromagnetic field generated by the device, controlling the field strength of the fluctuating electromagnetic field such that power dissipated in the elongate susceptor is between 5 and 6 Watts for a first period of time, and changing the field strength of the fluctuating electromagnetic field such that power dissipated in the elongate susceptor is between 1.5 and 2 Watts for a second period of time.

During the first period of time the susceptor heats the aerosol-forming substrate rapidly to operating temperature for delivery of an aerosol. The first period of time may last, for example, for between 1 and 10 seconds. During the second period of time the susceptor maintains the aerosol-forming substrate at its operating temperature. By reducing the power dissipated by the susceptor, overheating of the aerosol-forming substrate may be prevented and battery life of the device may be improved.

The electrically-operated aerosol-generating device may be any device described herein. Preferably the frequency of the fluctuating electromagnetic field is maintained to be between 1 and 30 MHz, for example between 5 and 7 MHz.

A method of producing an aerosol-generating article as described or defined herein comprises the steps of, assembling a plurality of elements in the form of a rod having a mouth end and a distal end upstream from the mouth end, the plurality of elements including an aerosol-forming substrate and an elongate susceptor element arranged substantially longitudinally within the rod and in thermal contact with the aerosol-forming substrate. The susceptor is preferably in direct contact with the aerosol-forming substrate.

Advantageously, the aerosol-forming substrate may be produced by gathering at least one sheet of aerosol-forming material and circumscribing the gathered sheet by a wrapper. A suitable method of producing such an aerosol-forming substrate for a heated aerosol-generating article is disclosed in WO2012164009. The sheet of aerosol-forming material may be a sheet of homogenised tobacco. Alternatively, the sheet of aerosol-forming material may be a non-tobacco material, for example a sheet comprising a nicotine salt and an aerosol former.

The elongate susceptor, or each elongate susceptor, may be inserted into the aerosol-forming substrate prior to the aerosol-forming substrate being assembled with other elements to form an aerosol-generating article. Alternatively, the aerosol-forming substrate may be assembled with other elements prior to the susceptor being inserted into the aerosol-forming substrate.

Features described in relation to one aspect or embodiment may also be applicable to other aspects and embodiments. Specific embodiments will now be described with reference to the figures, in which.

Figure 1:
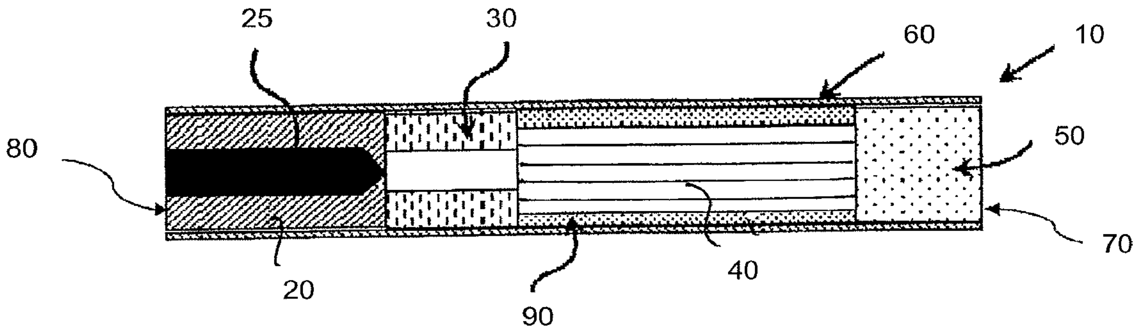
FIG. 1 is a schematic cross-sectional illustration of a specific embodiment of an aerosol-generating article.

FIG. 1 illustrates an aerosol-generating article 10 according to a preferred embodiment. The aerosol-generating article 10 comprises four elements arranged in coaxial alignment: an aerosol-forming substrate 20, a support element 30, an aerosol-cooling element 40, and a mouthpiece 50. Each of these four elements is a substantially cylindrical element, each having substantially the same diameter. These four elements are arranged sequentially and are circumscribed by an outer wrapper 60 to form a cylindrical rod. A blade-shaped susceptor 25 is located within the aerosol-forming substrate, in contact with the aerosol-forming substrate. The susceptor 25 has a length that is approximately the same as the length of the aerosol-forming substrate, and is located along a radially central axis of the aerosol-forming substrate.

The susceptor 25 is a ferritic iron material having a length of 10 mm, a width of 3 mm and a thickness of 1 mm. One or both ends of the susceptor may be sharpened or pointed to facilitate insertion into the aerosol-forming substrate.

The aerosol-generating article 10 has a proximal or mouth end 70, which a user inserts into his or her mouth during use, and a distal end 80 located at the opposite end of the aerosol-generating article 10 to the mouth end 70. Once assembled, the total length of the aerosol-generating article 10 is about 45 mm and the diameter is about 7.2 mm.

In use air is drawn through the aerosol-generating article by a user from the distal end 80 to the mouth end 70. The distal end 80 of the aerosol-generating article may also be described as the upstream end of the aerosol-generating article 10 and the mouth end 70 of the aerosol-generating article 10 may also be described as the downstream end of the aerosol-generating article 10. Elements of the aerosol-generating article 10 located between the mouth end 70 and the distal end 80 can be described as being upstream of the mouth end 70 or, alternatively, downstream of the distal end 80.

The aerosol-forming substrate 20 is located at the extreme distal or upstream end 80 of the aerosol-generating article 10. In the embodiment illustrated in FIG. 1, aerosol-forming substrate 20 comprises a gathered sheet of crimped homogenised tobacco material circumscribed by a wrapper. The crimped sheet of homogenised tobacco material comprises glycerine as an aerosol-former.

The support element 30 is located immediately downstream of the aerosol-forming substrate 20 and abuts the aerosol-forming substrate 20. In the embodiment shown in FIG. 1, the support element is a hollow cellulose acetate tube. The support element 30 locates the aerosol-forming substrate 20 at the extreme distal end 80 of the aerosol-generating article 10 so that it can be penetrated by the susceptor 25 during manufacture of the aerosol-generating article 10. Thus, the support element 30 helps prevent the aerosol-forming substrate 20 from being forced downstream within the aerosol-generating article 10 towards the aerosol-cooling element 40 when the susceptor 25 is inserted into the aerosol-forming substrate 20. The support element 30 also acts as a spacer to space the aerosol-cooling element 40 of the aerosol-generating article 10 from the aerosol-forming substrate 20.

The aerosol-cooling element 40 is located immediately downstream of the support element 30 and abuts the support element 30. In use, volatile substances released from the aerosol-forming substrate 20 pass along the aerosol-cooling element 40 towards the mouth end 70 of the aerosol-generating article 10. The volatile substances may cool within the aerosol-cooling element 40 to form an aerosol that is inhaled by the user. In the embodiment illustrated in FIG. 1, the aerosol-cooling element comprises a crimped and gathered sheet of polylactic acid circumscribed by a wrapper 90. The crimped and gathered sheet of polylactic acid defines a plurality of longitudinal channels that extend along the length of the aerosol-cooling element 40.

The mouthpiece 50 is located immediately downstream of the aerosol-cooling element 40 and abuts the aerosol-cooling element 40. In the embodiment illustrated in FIG. 1, the mouthpiece 50 comprises a conventional cellulose acetate tow filter of low filtration efficiency.

To assemble the aerosol-generating article 10, the four cylindrical elements described above are aligned and tightly wrapped within the outer wrapper 60. In the embodiment illustrated in FIG. 1, the outer wrapper is a conventional cigarette paper. The susceptor 25 is then inserted into the distal end 80 of the assembly such that it penetrates the aerosol-forming substrate 20 to form the complete aerosol-generating article 10.

As an alternative method of assembly, the susceptor 25 may be inserted into the aerosol-forming substrate 20 prior to the assembly of the plurality of elements to form a rod.

The aerosol-generating article 10 illustrated in FIG. 1 is designed to engage with an electrically-operated aerosol-generating device comprising an induction coil, or inductor, in order to be smoked or consumed by a user.

Figure 2:
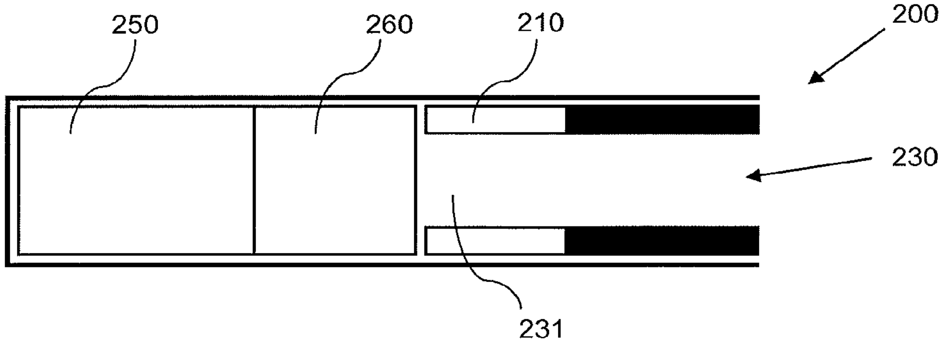
FIG. 2 is a schematic cross-sectional illustration of a specific embodiment of an electrically-operated aerosol-generating device for use with the aerosol-generating article illustrated in FIG. 1.

A schematic cross-sectional illustration of an electrically-operated aerosol-generating device 200 is shown in FIG. 2. The aerosol-generating device 200 comprises an inductor 210. As shown in FIG. 2, the inductor 210 is located adjacent a distal portion 231 of a substrate receiving chamber 230 of the aerosol-generating device 200. In use, the user inserts an aerosol-generating article 10 into the substrate receiving chamber 230 of the aerosol-generating device 200 such that the aerosol-forming substrate 20 of the aerosol-generating article 10 is located adjacent to the inductor 210.

The aerosol-generating device 200 comprises a battery 250 and electronics 260 that allow the inductor 210 to be actuated. Such actuation may be manually operated or may occur automatically in response to a user drawing on an aerosol-generating article 10 inserted into the substrate receiving chamber 230 of the aerosol-generating device 200.

Figure 3:
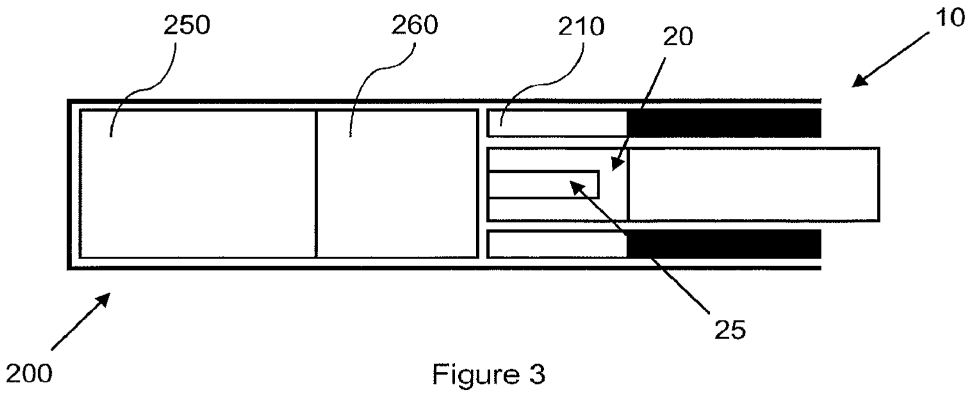
FIG. 3 is a schematic cross-sectional illustration of the aerosol-generating article of FIG. 1 in engagement with the electrically-operated aerosol-generating device of FIG. 3.

When actuated, a high-frequency alternating current is passed through coils of wire that form part of the inductor. This causes the inductor 210 to generate a fluctuating electromagnetic field within the distal portion 231 of the substrate receiving cavity 230 of the device. The electromagnetic field preferably fluctuates with a frequency of between 1 and 30 MHz, preferably between 2 and 10 MHz, for example between 5 and 7 MHz. When an aerosol-generating article 10 is correctly located in the substrate receiving cavity 230, the susceptor 25 of the article 10 is located within this fluctuating electromagnetic field. The fluctuating field generates eddy currents within the susceptor, which is heated as a result. The heated susceptor heats the aerosol-forming substrate 20 of the aerosol-generating article 10 to a sufficient temperature to form an aerosol, for example about 340 degrees Celsius. The aerosol is drawn downstream through the aerosol-generating article 10 and inhaled by the user. FIG. 3 illustrates an aerosol-generating article in engagement with an electrically-operated aerosol-generating device.

The specific embodiment described in relation to FIG. 1 comprises an aerosol-forming substrate formed from homogenised tobacco. In other embodiments the aerosol-forming substrate may be formed from different material. For example, a second specific embodiment of an aerosol-generating article has elements that are identical to those described above in relation to the embodiment of FIG. 1, with the exception that the aerosol-forming substrate 20 is formed from a non-tobacco sheet of cigarette paper that has been soaked in a liquid formulation comprising nicotine pyruvate, glycerine, and water. The cigarette paper absorbs the liquid formulation and the non-tobacco sheet thus comprises nicotine pyruvate, glycerine and water. The ratio of glycerine to nicotine is 5:1. In use, the aerosol-forming substrate 20 is heated to a temperature of about 220 degrees Celsius. At this temperature an aerosol comprising nicotine pyruvate, glycerine, and water is evolved and may be drawn through the filter 50 and into the user's mouth. It is noted that the temperature that the substrate 20 is heated to is considerably lower than the temperature that would be required to evolve an aerosol from a tobacco substrate.

In one specific embodiment of an aerosol-generating article, the article is as described above in relation to FIG. 1 with the exception that the susceptor has a length of 12 mm, a width of 4 mm, and a thickness of 12 micrometres. The susceptor is formed from grade 430 stainless steel. The device may be consumed using an electrically-operated aerosol-generating device as described above. In a preferred example, the device produces a fluctuating electromagnetic field having a frequency of about 7 MHz and a magnetic field strength (H-field) of about 2.5 kA/m. In a preferred example, the field strength is varied during consumption of the article to change the power dissipated by the susceptor and hence the energy supplied to the aerosol-forming substrate during consumption of the article. This may allow the aerosol-forming substrate to swiftly reach an operating temperature, for example about 340 degrees centigrade, and then be maintained at or near to that temperature efficiently by supplying a lower amount of energy.

The exemplary embodiments described above are not intended to limit the scope of the claims. Other embodiments consistent with the exemplary embodiments described above will be apparent to those skilled in the art.

The invention claimed is:

1. An aerosol-generating article, comprising:

a plurality of elements assembled in a form of a rod having a mouth end and a distal end upstream from the mouth end, the plurality of elements including an aerosol-forming substrate located at or towards the distal end of the rod, wherein an elongate susceptor is arranged substantially longitudinally within the rod and in thermal contact with the aerosol-forming substrate, wherein the aerosol-forming substrate comprises tobacco, and wherein the aerosol-forming substrate further comprises a single aerosol former or a combination of two or more aerosol formers.

2. The aerosol-generating article according to claim 1, wherein the single aerosol-former, or the combination of two or more aerosol-formers, comprises a polyhydric alcohol or mixtures thereof.

3. The aerosol-generating article according to claim 1, wherein the single aerosol-former, or the combination of two or more aerosol-formers, further comprises one of propylene glycol, triethylene glycol, 1,3-butanediol, and glycerine.

4. The aerosol-generating article according to claim 1, wherein the aerosol-forming substrate has an aerosol former content of greater than 5% on a dry weight basis.

5. The aerosol-generating article according to claim 1, wherein the elongate susceptor is located within the aerosol-forming substrate.

6. The aerosol-generating article according to claim 1, wherein the elongate susceptor is positioned in a radially central position within the rod and extends along a longitudinal axis of the rod.

7. The aerosol-generating article according to claim 1, wherein the elongate susceptor has a thickness of between 10 micrometres and 100 micrometres.

8. The aerosol-generating article according to claim 1, wherein the elongate susceptor is shaped as a pin, a rod, or a blade.

9. The aerosol-generating article according to claim 1, wherein the elongate susceptor comprises a metal.

10. The aerosol-generating article according to claim 9, wherein the metal is a ferritic iron or a stainless steel, or a grade 410, 420, or 430 stainless steel.

11. The aerosol-generating article according to claim 10, wherein the elongate susceptor further comprises a non-metallic core with a metal layer disposed on the non-metallic core.

12. The aerosol-generating article according to claim 1, wherein the aerosol-forming substrate is in the form of a rod comprising a gathered sheet of aerosol-forming material.

13. The aerosol-generating article according to claim 12, wherein the aerosol-forming material is a sheet of homogenised tobacco.

14. An aerosol-generating system, comprising: an electrically-operated aerosol-generating device having an inductor configured to produce a fluctuating electromagnetic field; and an aerosol-generating article according to claim 1, the aerosol-generating article engaging with the aerosol-generating device such that the fluctuating electromagnetic field produced by the inductor induces a current in the susceptor, causing the susceptor to heat up.

15. The aerosol-generating system according to claim 14, wherein the electrically-operated aerosol-generating device is configured to generate a fluctuating electromagnetic field having a frequency of between 1 MHz and 30 MHz and an H-field strength of between 1 kilo amperes per metre (kA/m) and 5 kilo kA/m, and the aerosol-generating article includes an elongate susceptor configured to dissipate power of between 1.5 Watts and 8 Watts when positioned within the fluctuating electromagnetic field.

* * * * *